United States Patent
Hjelmstad et al.

(10) Patent No.: US 7,411,537 B2
(45) Date of Patent: Aug. 12, 2008

(54) DIGITIZER ARRANGEMENT

(75) Inventors: Jens Fredrik Hjelmstad, Lillestrøm (NO); Per Atle Våland, Oslo (NO)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 11/568,946

(22) PCT Filed: Dec. 30, 2004

(86) PCT No.: PCT/NO2004/000409

§ 371 (c)(1),
(2), (4) Date: Nov. 10, 2006

(87) PCT Pub. No.: WO2005/117278

PCT Pub. Date: Dec. 8, 2005

(65) Prior Publication Data

US 2007/0241949 A1    Oct. 18, 2007

(30) Foreign Application Priority Data

May 28, 2004  (NO) ................................. 20042234

(51) Int. Cl.
*H03M 1/12* (2006.01)
(52) U.S. Cl. ...................... 341/155; 341/156
(58) Field of Classification Search ............... 341/155, 341/156, 120
See application file for complete search history.

(56) References Cited

U.S. PATENT DOCUMENTS

| 7,068,212 | B2 * | 6/2006 | Aker et al. ................... 342/114 |
| 2002/0176522 | A1 | 11/2002 | Fan |
| 2004/0032358 | A1 | 2/2004 | Asami |

OTHER PUBLICATIONS

Patent Abstracts of Japan vol. 015, No. 004 (E-1020) Jan. 8, 1991 & JP 02260820 A (NEC Home Electron Ltd) Oct. 23, 1990.

* cited by examiner

*Primary Examiner*—Rexford Barnie
*Assistant Examiner*—Joseph Lauture
(74) *Attorney, Agent, or Firm*—Roger S. Burleigh

(57) ABSTRACT

A digitizer arrangement for converting an analogue signal into a digital signal, including a first A/D converter, said first A/D converter being arranged to convert said analogue signal into a first digital signal with a first sampling rate, the first sampling rate being lower than the frequency of the analogue signal, a second A/D converter, said second A/D converter being arranged to convert said high frequency analogue signal into a second digital signal with a second sampling rate, the second sampling rate being lower than the frequency of the analogue signal, means for combining said first and second digital signals into a third digital signal with a third sampling rate that is at least a multiple of said first and second sampling rates.

4 Claims, 4 Drawing Sheets

DIGITIZER ARRANGEMENT

TECHNICAL BACKGROUND

The present invention discusses a novel structure for a high resolution/high sample rate digitizer. The digitizer is intended for use in radio receivers with digital signal processing, and is particularly suited for use in a direction-finder system for detecting and localising radio frequency emitters.

Modern radio receivers often use digital signal processing (DSP) for processing received signals. Such receivers use analogue front-ends with an Analogue/Digital (A/D) converter somewhere in the receiving chain. Ideally, the A/D converter should have as high resolution as possible, both in bit rate and bit resolution, either to sample high frequency signals, e.g. in a receiver with few conversion steps, or in order to cover a large frequency band.

While there is a steady increase in the performance of commercially available A/D converters, one is still faced with a choice of either using an A/D converter with fast sampling rate and few bits, or use a converter with higher resolution at a slower sampling rate.

In the so-called "gain-ranging" technique an A/D converter are preceded by an amplifier with programmable gain. A logic unit control the gain of the amplifier to expand the dynamic range of the digitiser system. Other solutions stack multiple fast/few bit A/D converters to obtain a composite fast converter with high bit resolution. This is done by connecting converters to a number of amplifiers with different gains and bit stack the output signals from the converters. The company Stagetech markets such digitiser systems for audio use, and it is also known from marine depth sounders.

SUMMARY OF THE INVENTION

An object of the present invention is to provide a digitizer for converting an analogue signal into a digital signal, which has an improved efficiency compared with prior art systems.

This object is achieved in an arrangement as claimed in the appended patent claims.

In particular the invention relates to a digitizer employing two stacked A/D converters with different sampling frequencies.

BRIEF DESCRIPTION OF THE DRAWINGS

The invention will now be described in detail in reference to the appended drawings, in which.

DETAILED DESCRIPTION OF THE INVENTION

Figure 1:
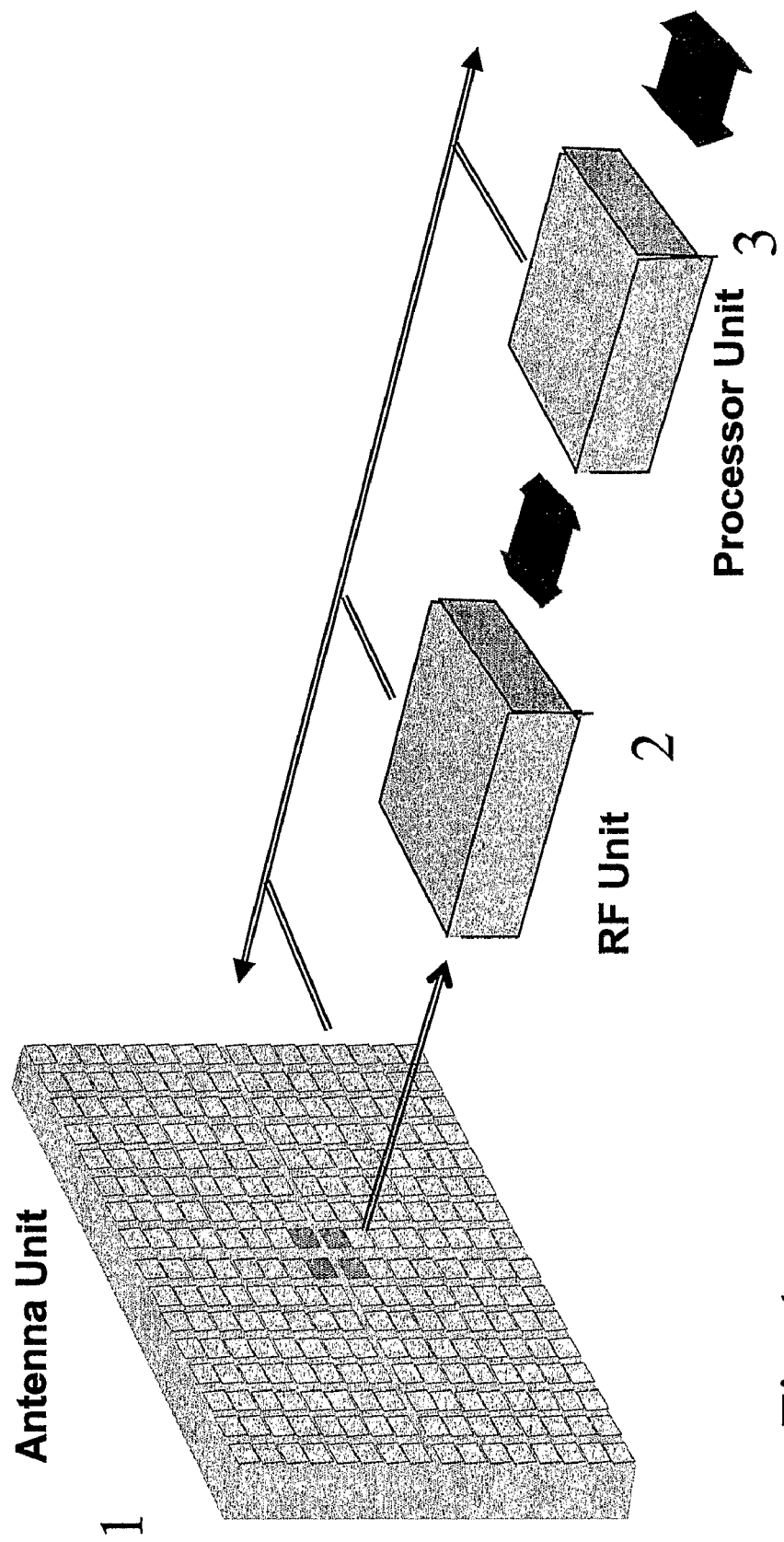
FIG. 1 illustrates a particular application of the inventive digitizer, in the receiver chains of a direction-finder system.

Initially, we will give an overview of a direction-finder system in which the present invention may find its application. As shown in FIG. 1, the direction-finder system includes an antenna unit 1 at left receiving RF signals from a number of emitter sources. The signals are delivered to an RF unit 2, center, where they are amplified, transposed down to baseband and demodulated. The demodulated signals are delivered to a processing unit 3 for processing and analysis. The antenna unit 1 is described in detail in co-pending patent application with title "An antenna arrangement", while the details of the RF unit are disclosed in co-pending patent application with title "Arrangements for receiving channels in a direction-finding system".

Briefly, the antenna arrangement includes four antenna panels mounted in a 2×2 relationship, as well as an omni-directional guard antenna that may be mounted at the center of the antenna unit.

Figure 2:
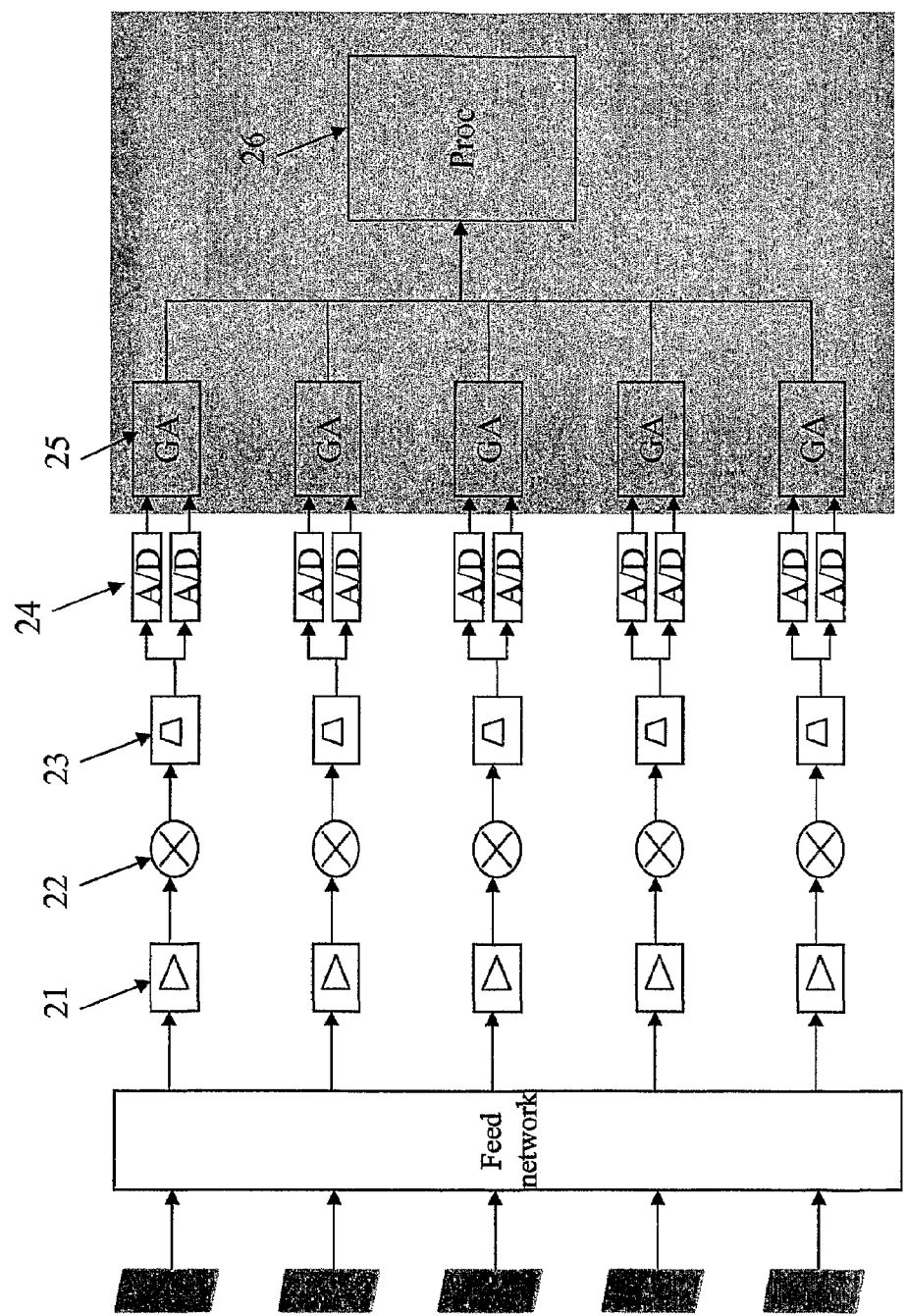
FIG. 2 is a schematic diagram of a receiver system including a digitizer according to the present invention.

FIG. 2 shows the receiver and processor section in the direction-finder system of FIG. 1. The receiver section comprises four phase channels and one guard channel. The figure shows the main components included in the receiver chains, i.e. amplifier 21, mixer 22 and bandpass filter 23. After the bandpass filter 23, the signals are digitized in a digitizer 24 according to the present invention. The digital signals are then processed in the following processor chain including gate arrays 25, which perform the main data reduction, and a CPU common for all chains, which perform the final signal analysis. The receivers illustrated in FIG. 2 are superheterodyne receivers with a single intermediate frequency. However, receivers with more conversion stages may also be used. Typically, the bandwidth at baseband will be about 200 MHz. The digitizer should ideally sample with a sampling frequency of at least 400 MHz, to satisfy Nyquist's theorem.

Figure 3:
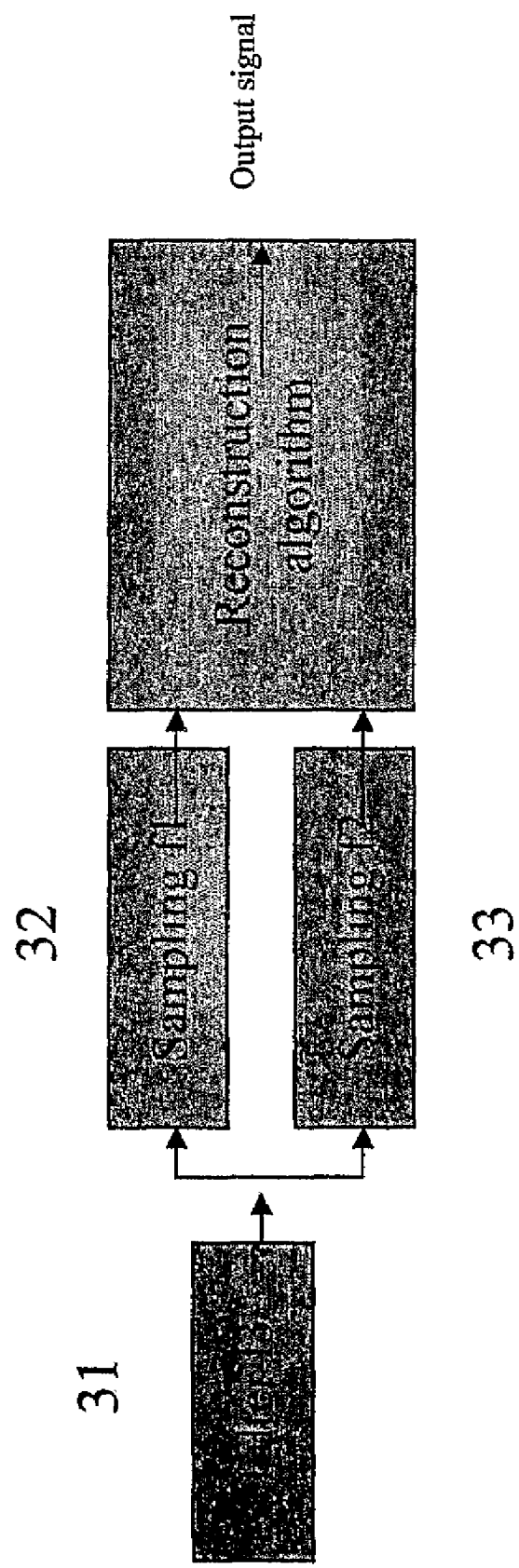
FIG. 3 illustrates a digitizer according to the present invention, including two stacked A/D converters.

The digitizer system illustrated in FIG. 3 includes an anti-aliasing filter 31 at the input. The filter is designed with a break frequency f3 which restrict the frequency of signals entering the subsequent digitizer to half the effective sampling rate of the digitizer. Signals that have passed the filter 31 are fed to two A/D converters 32, 33 in parallel. The A/D converters 32, 33 samples with different sampling frequencies (in the following example we will assume that the sampling frequencies are 70 MHz and 50 MHz, respectively). This utilizes the fact that the signals have a typical bandwidth of up to 15 MHz, and allows the system to operate on a substantially lower data rate than a single A/D with a sampling rate of 500 MHz (2.5 times the total bandwidth). At the reduced sampling frequency, A/D converters with up to 14 bits (84 dB) are available while at 500 MHz the resolution is typically 8 bits (48 dB). The digitiser samples the band continuously, and feed a signal processing gate array with a data stream of approximately 120 MS/s. The signal processing gate array combines the signals from the two A/D converters into a single signal with 14 bits resolution and 350 MHz sampling frequency. The new sampling rate should be a multiple of the two sampling rates, or a further multiple of this. Thus with 70 and 50 MHz digitizers, the lowest sampling rate becomes 350 MHz.

Figure 4:
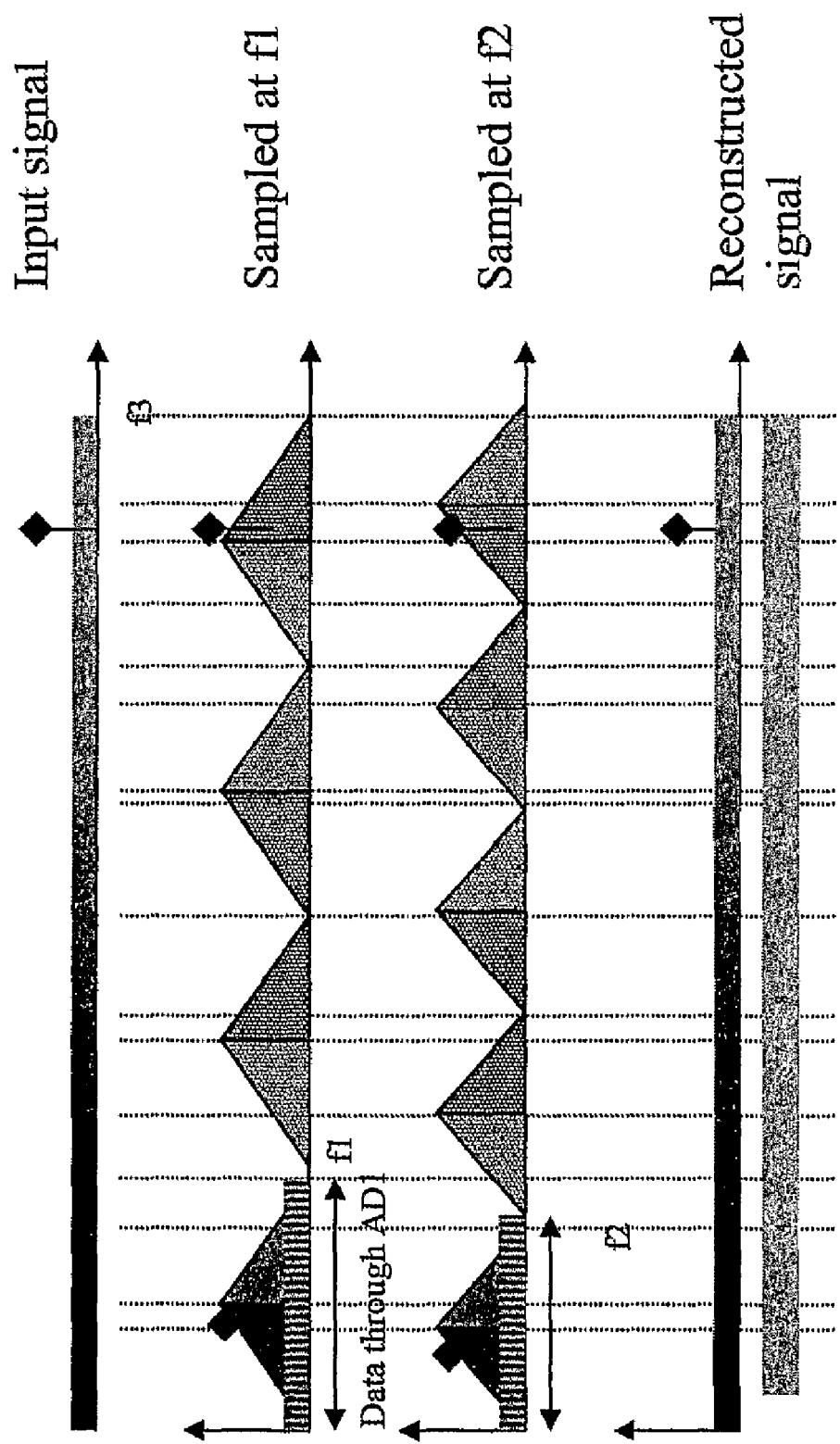
FIG. 4 is a schematic frequency domain diagram illustrating how an input signal is under-sampled by the two A/D converters with different sampling frequency.

An under-sampled signal will appear as having a lower frequency within the pass-band of the A/D converter. FIG. 4 illustrates the principle of the present invention. The figure shows a signal $f_i$ within a receiver pass-band stretching from 0 to $f_3$, $f_3$ being the cut-off frequency of the anti-aliasing filter 31. Due to the under-sampling, $f_i$ will be folded down into the pass-band of the respective A/D converter 32, 33. The pass-bands of the A/D converters are represented by dark and lighter shaded triangles. The triangles are symmetrical about half the sampling frequency (i.e. the Nyquist frequency). Folding occurs about multiples of the Nyquist frequency. The lighter shaded triangles represent areas of negative frequency.

If we had only one A/D converter, we could not know if the original signal was outside the converter pass-band, and the folding ratio in relation to the sampled "apparent" frequency. However, by using two converters, the frequency of the signal may be reconstructed unambiguously.

The "reconstruction" process may be performed by first identifying the corresponding signals in the two channels. Signal pairs are identified by detecting coincidence between the channels. Signals having a correlation factor over 0.9 over integration time $1/f_3$ are considered as valid pairs, while signals with lower correlation factor are muted. The two frequencies of a given signal pair, i.e. the absolute frequency values, and the relative difference between the frequencies, will hold information identifying the correct factor to use when up-converting the signal back to its correct frequency. The spectrum is divided into separate frequency bands 1, 2, 3 . . . , as shown in the figure. In each of these bands there is a specific relationship between frequencies in A/D channels 1 and 2, and we may apply rules for the reconstruction of the signal $f_i$. The frequency shift factor n is given by the relationships:

$$f_{r1} = (f_i - nf_1), n = 0, 1, 2, 3 \ldots$$

$$f_{r2} = (f_i - mf_2), m = \left\{ \begin{array}{c} n \\ n+1 \end{array} \right\}$$

Where $f_i$ is the frequency of the incoming signal, $f_1$ is the sampling rate of A/D converter 1, $f_2$ is the sampling rate of A/D converter 2, $f_{r1}$ is the apparent frequency of the incoming signal registered by A/D converter 1 and $f_{r2}$ is the apparent frequency registered by A/D converter 2.

The value of n is dependent on in which bands $f_{r1}$ and $f_{r2}$ are falling. In the example shown in FIG. 4, we only need to consider two cases: If the apparent signal falls within the lower dark shaded triangles of both channels, i.e. both $f_{r1}$ and $f_{r2}$ is within band 1, then m=n. The other case is when one of the apparent signals falls in band 1 and the other falls in band 2. Then m=n+1. This is as shown in FIG. 4. Other cases do not apply.

Thus, the signal in A/D channel 1 is up-converted using a known frequency shift factor n, while the signal in A/D channel 2 is up-converted using a known and possibly different frequency shift factor m. When the signals have been up-converted, the signals from A/D channel 1 and A/D channel 2 are added. Alternatively, only the signal in one of the channels is up-converted. However, by using both signals, an improved signal-to-noise ratio is obtained.

While the example illustrated in FIG. 4 utilizes two A/D converters, the inventive digitizer may use more A/D converters. Another option is to combine the inventive way of stacking with the prior art multiple combination method mentioned in the introduction, and thus obtain a matrix of A/D converters. The combination may then have both high bit rate and high resolution.

The invention claimed is:

1. A digitizer arrangement for converting an analogue signal into a digital signal, comprising:
    a first AID converter, said first AID converter being arranged to convert said analogue signal into a first digital signal with a first sampling frequency, the first sampling frequency being lower than the frequency of the analogue signal;
    a second A/D converter, said second A/D converter being arranged to convert said high frequency analogue signal into a second digital signal with a second sampling frequency, the second sampling frequency being lower than the frequency of the analogue signal, said first and second sampling frequencies being different and with a non-harmonic relationship; and
    means for combining said first and second digital signals into a third digital signal with a third sampling frequency that is at least a multiple of said first and second sampling frequencies.

2. A digitizer as claimed in claim 1, further comprising:
    means for correlating the first and second digital signals, said means being arranged to mute signals with a correlation factor lower than 0.9 over integration time 1/f3, f3 being equal to the multiple of said first and second sampling frequencies.

3. A digitizer as claimed in claim 2, further comprising:
    means for identifying a corresponding signal pair in the first and second digital signals;
    means for determining a first conversion factor based on the frequencies of said signal pair; and
    means for transposing the frequency of said first digital signal to the third digital signal with said first conversion factor.

4. A digitizer as claimed in claim 2, further comprising:
    means for identifying a corresponding signal pair in the first and second digital signals;
    means for determining a first conversion factor based on the frequencies of said signal pair;
    means for transposing the frequency of said first digital signal to a fourth digital signal with said first conversion factor;
    means for determining a second conversion factor based on the frequencies of said signal pair;
    means for transposing the frequency of said second digital signal to a fifth digital signal with said second conversion factor; and,
    means for adding the fourth digital signal to the fifth digital signal and obtaining said third digital signal.

* * * * *

UNITED STATES PATENT AND TRADEMARK OFFICE
CERTIFICATE OF CORRECTION

PATENT NO. : 7,411,537 B2  Page 1 of 1
APPLICATION NO. : 11/568946
DATED : August 12, 2008
INVENTOR(S) : Jens Fredrik Hjelmstad et al.

It is certified that error appears in the above-identified patent and that said Letters Patent is hereby corrected as shown below:

In Column 4, Line 4, in Claim 1, after "a first" delete "AID" and insert -- A/D --, therefor.

In Column 4, Line 4, in Claim 1, after "said first" delete "AID" and insert -- A/D --, therefor.

Signed and Sealed this

Nineteenth Day of May, 2009

JOHN DOLL
*Acting Director of the United States Patent and Trademark Office*